United States Patent
O'Malley et al.

(10) Patent No.: US 9,250,685 B2
(45) Date of Patent: Feb. 2, 2016

(54) REMOTELY WAKING A SLEEPING DEVICE USING A WAKE CONFIGURATION FILE

(71) Applicant: Comcast Cable Communications, LLC, Philadelphia, PA (US)

(72) Inventors: Shawn O'Malley, Glenside, PA (US); Whitney Blackmon, Holland, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 363 days.

(21) Appl. No.: 13/668,954

(22) Filed: Nov. 5, 2012

(65) Prior Publication Data

US 2014/0129859 A1    May 8, 2014

(51) Int. Cl.
   *G06F 1/32* (2006.01)
(52) U.S. Cl.
   CPC ............ *G06F 1/3209* (2013.01); *G06F 1/3203* (2013.01); *G06F 1/3206* (2013.01)
(58) Field of Classification Search
   CPC ....... G06F 1/32; G06F 1/3203; G06F 1/3206; G06F 1/3209
   USPC .................................. 713/320, 323
   See application file for complete search history.

(56) References Cited

U.S. PATENT DOCUMENTS

| | | | |
|---|---|---|---|
| 5,054,052 A | 10/1991 | Nonami | |
| 5,245,346 A | 9/1993 | Nishimura et al. | |
| 5,479,260 A | 12/1995 | Fattinger | |
| 5,530,879 A | 6/1996 | Crump et al. | |
| 5,692,197 A | 11/1997 | Narad et al. | |
| 5,790,946 A * | 8/1998 | Rotzoll | 455/343.1 |
| 6,449,683 B1 | 9/2002 | Silvester | |
| 6,493,780 B2 | 12/2002 | Hsu | |
| 6,522,668 B1 | 2/2003 | Singleton et al. | |
| 6,567,921 B1 | 5/2003 | Guziak | |
| 6,593,845 B1 | 7/2003 | Friedman | |
| 6,760,578 B2 | 7/2004 | Rotzoll | |
| 7,050,775 B2 | 5/2006 | Mayor et al. | |
| 7,142,838 B2 | 11/2006 | Rotzoll | |
| 7,149,243 B2 | 12/2006 | Porat et al. | |
| 7,389,528 B1 | 6/2008 | Beser | |
| 7,512,981 B2 | 3/2009 | Pearson | |
| 7,650,135 B2 | 1/2010 | Twitchell | |
| 7,912,442 B2 | 3/2011 | Rotzoll | |
| 7,912,443 B2 | 3/2011 | Rotzoll | |
| 7,915,997 B2 | 3/2011 | King et al. | |
| 7,929,059 B2 | 4/2011 | Watson et al. | |
| 7,944,340 B1 | 5/2011 | Ghabra et al. | |
| 7,986,933 B2 | 7/2011 | Dehner et al. | |
| 7,995,508 B2 | 8/2011 | Ruy et al. | |
| 8,019,316 B2 * | 9/2011 | Huston et al. | 455/343.1 |
| 8,761,065 B2 | 6/2014 | Stephens et al. | |

(Continued)

OTHER PUBLICATIONS

TIA/EAI IS-54, "Cellular System Dual-Mode Mobile Station-Base Station Compatibility Standard," Telecommunications Industry Association, Apr. 1992.

(Continued)

*Primary Examiner* — Chun Cao
(74) *Attorney, Agent, or Firm* — Banner & Witcoff, Ltd.

(57) ABSTRACT

Disclosures related to waking a sleeping device while minimizing active components needed to receive a remote wakeup request. In one aspect, devices having an RF tuner, may be configured to detect a digital or an analog signal variation or change in RF signal characteristics. Further, the variation or change may be interpreted as a wakeup signal.

20 Claims, 5 Drawing Sheets

(56) References Cited

U.S. PATENT DOCUMENTS

| | | | |
|---|---|---|---|
| 2001/0041551 A1 | 11/2001 | Rotzoll | |
| 2002/0152473 A1* | 10/2002 | Unger | 725/120 |
| 2003/0119568 A1 | 6/2003 | Menard | |
| 2006/0198335 A1 | 9/2006 | Reunamaki et al. | |
| 2010/0003927 A1 | 1/2010 | Chou et al. | |
| 2010/0141400 A1 | 6/2010 | Radulescu et al. | |
| 2010/0259678 A1* | 10/2010 | Vantalon et al. | 348/553 |
| 2010/0330932 A1* | 12/2010 | Cowley et al. | 455/77 |
| 2011/0084815 A1 | 4/2011 | Fitzek | |
| 2011/0212698 A1* | 9/2011 | Le Guillou et al. | 455/196.1 |
| 2011/0258463 A1* | 10/2011 | Francisco | 713/300 |
| 2012/0069893 A1* | 3/2012 | Shirakata et al. | 375/239 |
| 2012/0190390 A1 | 7/2012 | Reunamaki et al. | |
| 2014/0094132 A1* | 4/2014 | Ravindran et al. | 455/182.1 |

OTHER PUBLICATIONS

K.J. Christensen et al., "The next frontier for communications networks: power management," Computer Communications 27 (2004), p. 1758-1770.

ANSI/SCTE 54 2009, "Digital Video Service Multiplex and Transport System Standard for Cable Television," © Society of Cable Telecommunications Engineers 2009, p. 1-18.

* cited by examiner

REMOTELY WAKING A SLEEPING DEVICE USING A WAKE CONFIGURATION FILE

BACKGROUND

With the increased attention being given to energy conservation, there is a growing demand to reduce the energy consumption of various electronic devices. Some devices may be placed in a lower power consumption mode, such as a sleep or hibernation mode, but devices in sleep often lose some functionality because they are asleep. For example, if a conventional digital video recorder (DVR) is turned off to conserve power, then that DVR may not be able to receive network updates or new program recording instructions. There remains a constant need to reduce power consumption while maintaining various functionality of a device when it is asleep.

SUMMARY

Features described herein relate generally to sleep modes in electronic devices, such as managing how the electronic devices may be configured to awake from sleep.

In some embodiments, a sleeping device such as television may lock a component, such as its RF tuner, to a predetermined RF frequency, and may activate a circuit configured to detect a change in the RF frequency's signal (e.g. modulation characteristics). Such a modulation characteristic change can be interpreted by the sleeping device as a wakeup signal. In this manner, other components in the sleeping device, such as a digital decoder normally used to detect control codes, may be deactivated while the device is in the sleep mode.

In one aspect, the change in signal characteristic can be a change in signal-to-noise ratio, a change in power level, a flashing of the on/off signal, or a pattern of such changes. A sleep management computing device may maintain configuration and schedule information for a sleeping device, and when the device is to be woken up, the sleep management computing device may modify a signal, e.g., the RF channel's modulation characteristics, such that the sleeping device, or an associated device that can control the sleeping device, can detect the signal.

In other aspects, the sleep management computing device which maybe a stand alone device, or port of another computing device, may monitor bandwidth usage and availability, as well as sleeping device capability, to dynamically identify a signal characteristic that can be used to wake up a particular sleeping device. The wake characteristics can be different for different sleeping devices.

These foregoing features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
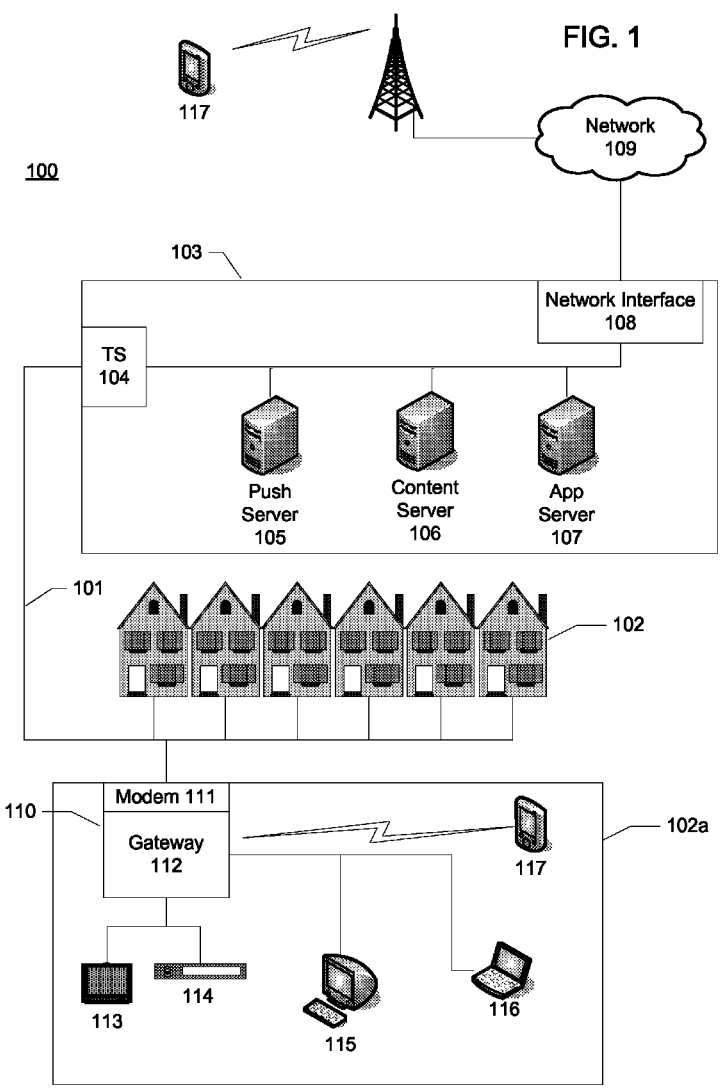
FIG. 1 illustrates an example information distribution network.

FIG. 1 illustrates an example information distribution or access network 100 on which many of the various features described herein may be implemented. Network 100 may be any type of information distribution network, such as satellite, telephone, cellular, wired or wireless, etc. One example may be a wireless network, an optical fiber network, a coaxial cable network or a hybrid fiber/coax (HFC) distribution network. Such networks 100 use a series of interconnected communication links 101 (e.g., coaxial cables, optical fibers, wireless links, etc.) to connect multiple homes 102 or other user locations to a local office or headend 103. The local office 103 may transmit downstream information signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other links, or wireless communication paths.

The local office 103 may include a termination system (TS) 104, such as a cable modem termination system (CMTS), which may be a computing device configured to manage communications between devices on the network of links 101 and backend devices such as servers 105-107 (to be discussed further below). The TS may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet Protocol devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones, or other network devices. For example, the network 109 may communicate with one or more content sources, such as multicast or unicast video sources, which can supply video streams for ultimate consumption by the various client devices in the homes 102.

As noted above, the local office 103 may include a variety of servers 105-107 that may be configured to perform various functions. For example, the local office 103 may include a push notification server 105 that can generate push notifications to deliver data and/or commands to the various homes 102 in the network (or more specifically, to the devices in the homes 102 that are configured to detect such notifications). The local office 103 may also include a content server 106 configured to provide content to users in the homes. This content may be, for example, video on demand movies, television programs, songs, text listings, etc. The content server may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be used to implement a cache server for the content found on the content server 106. Other example application servers may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include an interface device 110. The interface device 110 may include a network interface 111, such as a modem, which may include transmitters and receivers used to communicate on the links 101 and with the local office 103. The device 111 may be, for example, a coaxial cable modem (for coaxial cable links 101), a fiber interface node (for fiber optic links 101), or any other desired device having similar functionality. The device 111 may be connected to, or be a part of, a gateway interface device 112. The gateway interface device 112 may be a computing device that communicates with the device 111 to allow one or more other devices in the home to communicate with the local office 103 and other devices beyond the local office. The gateway 112 may be a set-top box (STB), digital video recorder (DVR), computer server, or any other desired computing device. The gateway 112 may also include (not shown) local network interfaces to provide communication signals to devices in the home, such as televisions 113, additional DVRs or STBs 114, personal computers 115, laptop computers 116, wireless devices 117 (wireless tablets, laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Any of the devices in the home, such as the gateway 112, STB 114, computer 115, etc., can include an application software client that can make use of the video images captured by the image capture servers.

Figure 2:
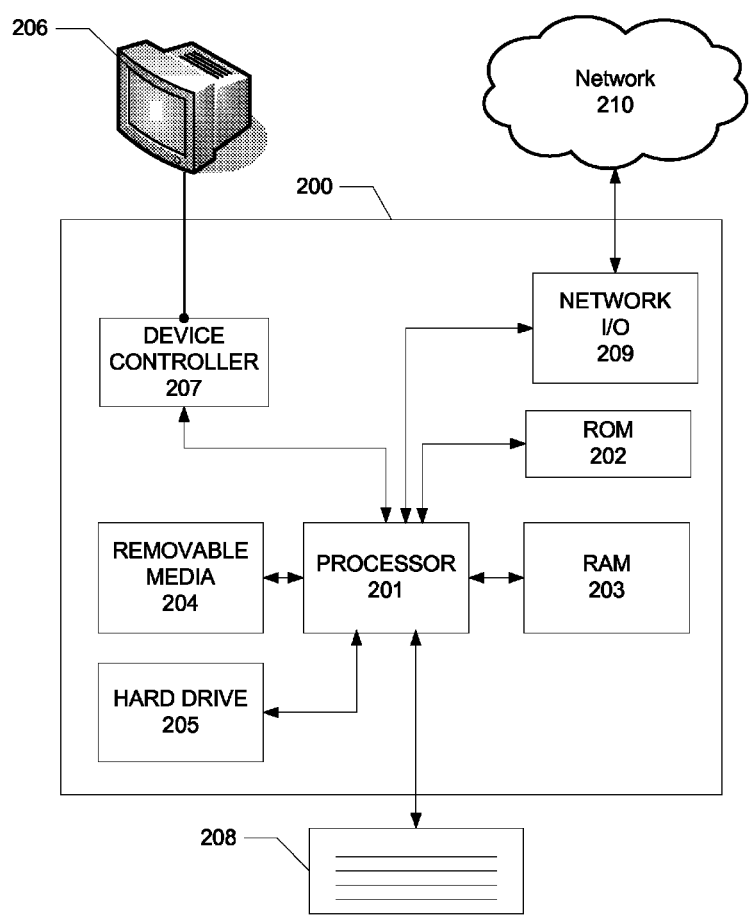
FIG. 2 illustrates an example computing device on which the various elements described herein can be implemented.

FIG. 2 illustrates general hardware elements that can be used to implement any of the various computing devices and/or software discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality to users accessing content from the local office 103 or another content storage facility or location. For example, one such user may be a viewer who is watching a television program being transmitted from the local office 103. In some embodiments, the user may be able to control his/her viewing experience (e.g., changing channels, adjusting volume, viewing a program guide, etc.) using any networked device, such as a cellular telephone, personal computer, personal data assistant (PDA), netbook computer, etc., aside from (or in addition to) the traditional infrared remote control that may have been supplied together with a television or STB.

Figure 3:
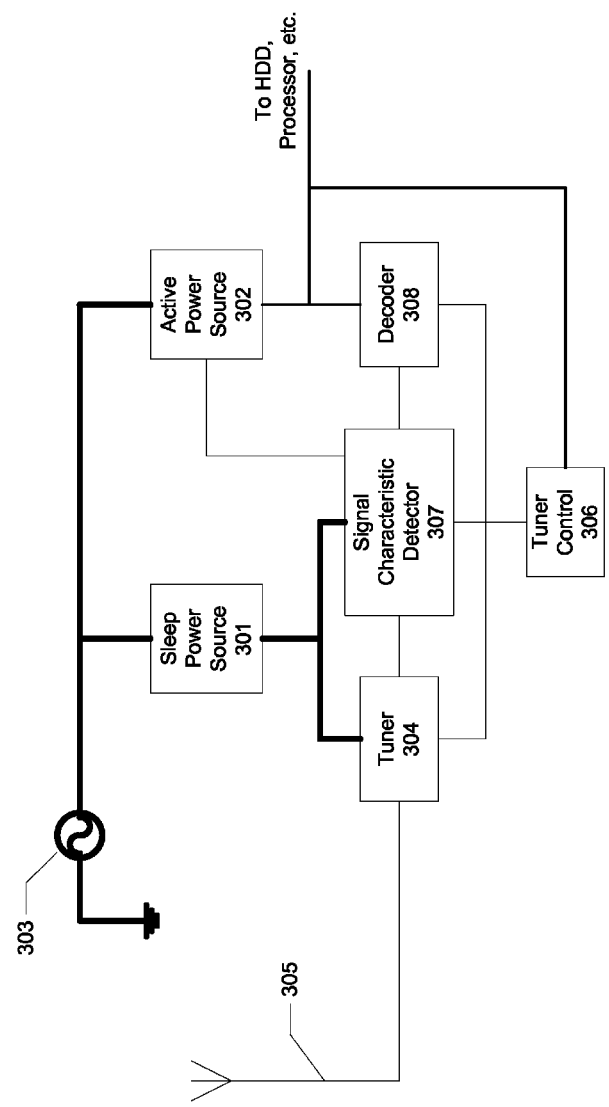
FIG. 3 illustrates an example device on which various elements description herein can be implemented.

FIG. 3 illustrates example power reduction, e.g., sleep cycle, circuit components of a computing device. A sleep mode or power reduction mode may be any mode in which a device's power consumption is reduced below a normal operating power consumption level. For example, a user's DVR may normally consume 40 Watts of power, and when in a sleep mode, the DVR may power down its hard disk drive and other components to reduce the power draw of the remaining active components to 20 Watts. In this example, the components may be coupled to, or part of, a radio frequency (RF) tuner found in a device that receives transmitted signals. For example, the sleep cycle components may be in the interface 110, modem 111, gateway 112, or DVR 114 or another device. In some embodiments, the sleep cycle circuit components may be part of a quadrature amplitude modulation (QAM) receiver. As will be described below, the sleep cycle components may allow an associated device to be placed in a sleep mode, and may detect a changing signal characteristic, e.g. an RF modulation characteristic on a predetermined RF frequency as a wake-up signal. The changing signal characteristic may be, for example, a predetermined change in a signal to noise (SNR) ratio on an RF channel. This predetermined change in SNR can be, for example, an increase of 0.8 dB. The sleep cycle circuit may be configured to automatically wake the device in response to a signal level increasing by 0.8 dB.

The components may include a sleep power source 301 and an active power source 302. These power sources are illustrated separately for ease of explanation, but they may be part of the same power device, and may be ultimately connected to a common power source 303. The sleep power source 301 may be a power switching circuit that supplies power to components that will remain operational when the device is placed in a sleep mode (power lines represented with thicker lines in FIG. 3). The active power source 302 may be a power switching circuit that supplies power to components that will be deactivated when the device is in the sleep mode.

The device may include a component, such as tuner 304, which may be coupled to an antenna 305. The tuner 304 and antenna 305 may, taken together, receive and tune an RF frequency (or to multiple frequencies). A tuner control processor 306 may control the tuner 304 to cause it to tune to a predetermined RF frequency. In some embodiments, the tuner 304 is a quadrature amplitude modulation (QAM) receiver that is configured to tune to an RF channel carrying a QAM signal, and the various RF characteristics described herein may be QAM characteristics.

A signal characteristic detector circuit 307 may receive a tuned signal from the tuner 304, and may be configured to detect one or more modulation characteristics of the signal. For example, the circuit 307 may detect the signal-to-noise ratio discussed above by measuring a received signal strength and comparing it to a background noise strength. A commercially available tuner or QAM receiver 304 may include a signal-to-noise ratio detector as part of its tuning circuitry.

The device may include a decoder 308, which may be a circuit configured to extract data from the RF signal received by the tuner 304 and antenna 305. For example, if the tuner 304 is a QAM tuner, then the decoder 308 may be configured to analyze the received signals of the incoming QAM RF channel, identify the incoming QAM symbols, and produce an output signal containing the digital data represented by the QAM symbols. The output signal may then be provided to another component in the system, such as a device processor 201, for further handling.

Figure 4A:
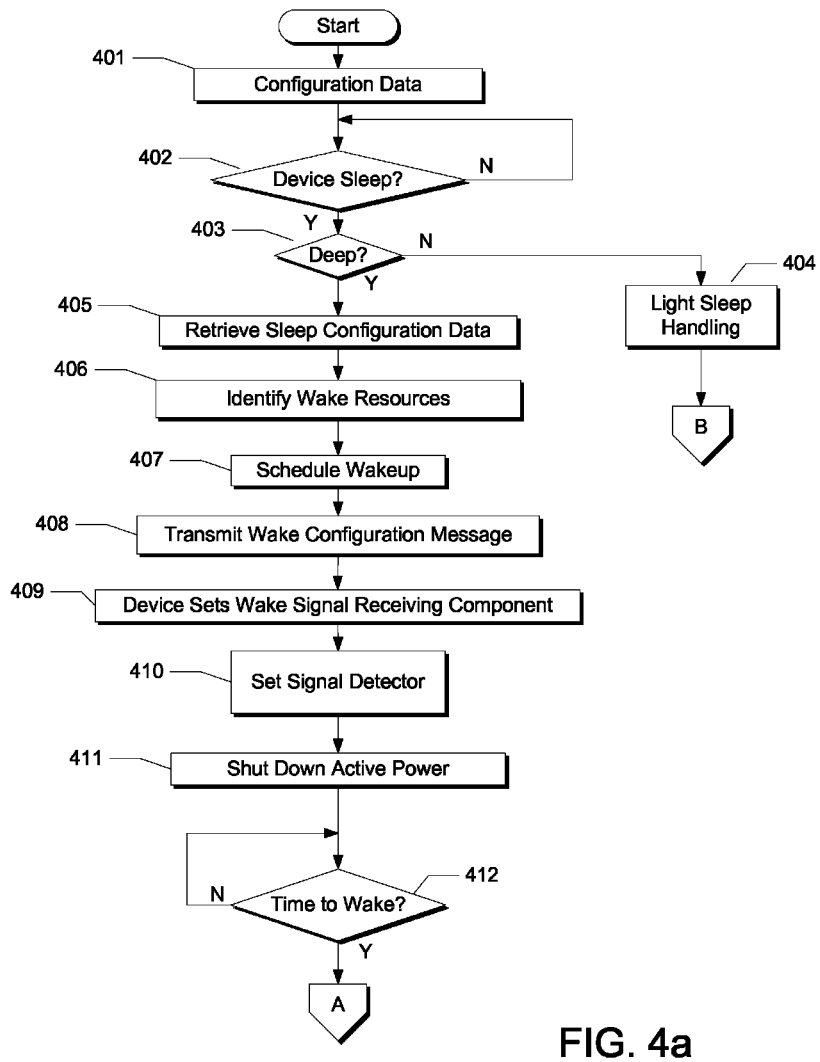
FIGS. 4a & b illustrate an example process in accordance with an aspect of the disclosure.

Operation of the sleep cycle circuit will be further explained below with reference to FIGS. 4*a* & *b*, which illustrate an example sleep cycle process. The process itself may be performed by any desired computing device that can enter a sleep mode, with some portions performed by an external sleep management computing device, such as application server 107.

In step 401, the sleep management computing device (which can be a remote application server 107, a local computing device in a DVR 114 or gateway 112, a component of a sleeping device, or any other shared or stand alone computing device) may determine, retrieve and/or store configuration information identifying how a particular device is to wake up. The configuration information may identify one or more RF signal modulation characteristics that a particular device may need to receive to be woken up—the device's wake signal configuration. As noted above, one example modulation characteristic is the signal to noise ratio (SNR). The configuration information may identify a particular device (e.g., by the device's unique Media Access Control (MAC) address, serial number, or other identifier), and identify a corresponding modulation characteristic. For example, a DVR's wake signal configuration may indicate that its wake signal will reside at 330 MHz, and that the modulation characteristic to use is a reduction of SNR by 0.8 dB. The wake signal configuration for a different DVR may indicate a different frequency and/or a different modulation characteristic. For example, a second DVR may use a reduction in SNR by 0.4 dB on 336 MHz as a wake up signal.

Other modulation characteristics may be used instead of the SNR. For example, another modulation characteristic may be a pattern of blanking a particular RF frequency a predetermined number of times within a predetermined time period. For example, blanking a channel three times within 5 seconds may be used as a wake signal. In such an example, a DVR may use its sleep circuit to monitor a 330 MHz channel, and check to determine if the signal on that channel is blanked the appropriate number of times.

Another modulation characteristic may be a predetermined change in the overall power level of a channel. For example, a device may use a 0.5 dB increase in power level as a wake signal.

Another modulation characteristic may involve dropping points in a QAM signal. For example, a 64QAM modulation scheme may initially use 64 possible symbol points to transmit data, and that modulation scheme can be altered to omit one or more points from the scheme. This drop in the number of available points may be detected by the QAM tuner.

The modulation characteristic may themselves be comprised of multiple modulation characteristics. For example, a device may be able to use any one of a variety of different characteristics as a wakeup signal (e.g., SNR reduction, SNR increase, flashing channel off, etc.). Combinations of modulation characteristics may be used as well. For example, a wakeup signal may entail flashing a channel at 330 MHz off three times, and then increasing the SNR on the channel by 0.5 dB.

In addition to identifying a sleep mode wakeup signal change characteristic, the configuration data may also identify other parameters for a particular device. For example, the sleep management computing device may store a wake/sleep schedule for a device. The wake/sleep schedule may identify times at which the device should be switched from a sleep mode to a wake mode, or vice versa. This configuration information may be obtained from a user, who may specify that the user typically is away from home from 8 am to 7 pm, and accordingly, the user's DVR can be placed in to a lower power consumption mode during that time period. The configuration information may also include information identifying time(s) at which the user's device should be woken up, such as times when a user's DVR should be woken up in order to tune to and record a scheduled broadcast television program. Although not illustrated, the configuration data may be continuously updated as times and settings change. For example, if a user logs in to a website at the office, and schedules a recording for his/her home DVR, this scheduling may be added to the configuration data in the sleep management computing device, and may be processed in the steps described below.

In step 402, the sleep management computing device may determine whether a managed device needs to enter into a sleep mode. This may occur, for example, if the device's sleep schedule indicates that the device should go to sleep (e.g., it is Sam in the example above), or if the user has entered a command (either using the DVR or remotely via an Internet web portal of the sleep management device) to place the device into sleep, or if the DVR itself automatically determines that it should enter into a sleep mode (e.g., if a predetermined amount of time elapses without any user interacting with the device, the device may determine to go to sleep). A sleep command can be generated by the device itself and sent up to the sleep management computing device, or generated by the sleep management computing device and transmitted to the device (allowing remote entry of sleep mode).

If a device needs to go to sleep, then for that device, the process may proceed to step 403 (for other devices, the process may return to step 402—the illustrated example shows one device embodiment for ease of explanation). In step 403, the sleep management computing device may determine the kind of sleep that the device is to enter. In some embodiments, a device is capable of entering different levels of sleep. For example, a DVR may have a light sleep mode in which the hard drive and certain input/output interfaces (e.g., Universal Serial Bus interfaces, hard drive interfaces, IEEE-1394 interfaces, etc.) remain activated, while other components (e.g., an audio signal processing circuit, a video processor, etc.) may be powered down or placed in a low power mode (e.g., a processor's clock speed may be reduced, a display may be dimmed, etc.). If the device is only to enter a light sleep mode, then in step 404, the sleep management device may process light sleep handling. In some embodiments, the light sleep handling may simply involve instructing the device to enter into a light sleep mode, and the sleep management computing device need not take any further action, relying instead on the device itself to manage its own sleep/wake processing. In some embodiments, a device in a light sleep mode will wake itself up on its own, without relying on an external wakeup signal, and a device in a deep sleep mode will rely on an external signal to wake up. Step 403 and 404 may be optional, however, as devices need not have multiple sleep modes.

If the device is to enter a deep sleep mode, or a mode in which the sleep management computing device will need to send a wakeup signal, then in step 405, the sleep management computing device may retrieve sleep configuration data for the device that is about to sleep. The sleep configuration data may identify a variety of parameters for how the sleeping device is to be woken up. For example, the sleep configuration data may identify an RF frequency on which the wakeup signal will be carried. The identification of the RF frequency can depend on the current bandwidth usage of the network, and can vary from sleeping device to sleeping device. For example, the sleep management computing device may be located at a local office 103, which may manage shared bandwidth for a plurality of user homes 102. The local office 103 may allocate available bandwidth to devices according to any desired protocol (e.g., following DOCSIS), and in doing so the local office 103 may store information identifying RF channels that are in use, and RF channels that are available. In step 405, the sleep management computing device may receive information identifying an available RF channel that can be used for the device's wakeup signal, and the sleep management computing device may inform the sleeping device during configuration of the RF channel that will be used for wakeup. In some embodiments, the sleeping device may be configured to automatically scan a predetermined subset of RF channels to identify one that is used as a wakeup channel (e.g., the channel may be carrying a predetermined signal identifying it as a wakeup channel). In some embodiments, the wakeup RF channel may be designated for other uses, in addition to carrying the wakeup signal. In such an embodiment, then the management of that RF channel can simply ensure that the wakeup characteristic is not otherwise used on the RF channel for the other use. The configuration process can also include providing the sleeping device with information identifying the other types of signaling that are in use, to allow the sleeping device configure itself to ignore those other types of signals. So for example, if a QPSK channel were used for an always on service (e.g., a software download channel), then the wakeup characteristic for a first sleeping device could be a sequence of 3 signal drops within a set period of time (e.g., one second), and a signal-to-noise change can be used for a different device, if those characteristics do not carry meaning in the software download service The sleep configuration data may also identify one or more modulation characteristics that can be used as a wakeup signal for the device. Different devices may employ different types of sleep circuits and different types of modulation characteristic detectors 307 that can remain powered on in the sleep mode. For example, some devices may happen to have their signal-to-noise ratio detector wired to receive power only when the device's main processor and circuit board are running, and for those devices the SNR change might not be detectable in the sleep mode. Those devices may have other circuits that can still function in the sleep mode. For example, they may have a tuner 304 that can detect the presence of an RF channel, and the tuner is able to remain powered on while the other portions of the device are powered off. For such a device, the sleep mode configuration data may indicate that the wakeup signal should blank an RF channel three times to signal a wakeup.

The sleep configuration data may also identify a time when the device should be woken up. For example, if the user has programmed his/her DVR to record a television show later this evening, the sleep configuration data may identify this fact. This data may be obtained, for example, by polling the DVR and/or otherwise reading its event timer to identify scheduled events. This data may also be obtained from any other source that is available to the user to schedule a recording. So, for example, if the user is able to access an Internet site from a remote computer (e.g., via a smartphone while on the train) to set a program record schedule, then the sleep management computing device may transmit a message to the server hosting the Internet site, and request a copy of the user's program record schedule.

In some embodiments, the sleep configuration data may include an expiration time, and instructions identifying a way of obtaining or generating a new sleep configuration file if the current time is after the expiration time. Use of an expiration time may cause the retrieving sleep management device to re-evaluate the wakeup RF characteristic that is best suited for the sleeping device, such as by evaluating the latest RF channel usage to identify a new RF channel to carry the wakeup RF characteristic. If the sleep management computing device is unable to solicit a new sleep configuration file by request (e.g., if the sleep management computing device is only able to receive signals from a further source such as another application server, and not transmit signals to that other source), then the source can be configured to periodically broadcast new sleep configuration information with information indicating the version or effective time of the broadcast configuration information, and the sleep management device may be configured to receive the broadcast, compare the version or effective time information, and update its own stored sleep configuration files if the broadcast version is newer than what is currently already stored by the sleep management device.

In step 406, the sleep management computing device may determine what wake resources are available (or scheduled to be available) at the sleep management computing device for waking up the device. The wake resources may be signal transmitters that are capable of transmitting the requisite wakeup signal (e.g., with signal characteristic change, such as an RF modulation change) at the desired time to the desired receiving device. The sleep management computing device may have a variety of circuits for changing a signal characteristic, but some circuits may be scheduled for other tasks at the desired wakeup time for the device, or may otherwise be unavailable. The sleep management computing device may compare its own schedule and list of available modulation characteristic circuitry, with the types of modulation characteristic changes indicated by the device's sleep configuration data, to find a suitable modulation characteristic that both devices (the sleeping device and the sleep management computing device) can use for the wakeup signal.

In step 407, the sleep management computing device may schedule the wakeup signal. This scheduling may include storing information in a wakeup schedule database in the device's available memory. The wakeup schedule may identify the sleeping device (e.g., by a unique address such as a MAC address or Internet-Protocol (IP) address), a time (or times) when the sleeping device should be woken up, an RF channel frequency to be used to carry the wakeup signal, and the type of modulation characteristic change that is to be used to send the wakeup signal.

In step 408, the sleep management computing device may transmit a wake configuration message to the device that needs to sleep. The message may identify the RF channel frequency on which the wakeup signal will arrive, and the modulation characteristic change that will be used. So, for example, this message may inform a device that the wakeup signal will arrive on RF channel 300 MHz, and that the modulation characteristic change will be two successive 0.8 dB increases in signal to noise ratio over a one-second period.

In step 409, the device may receive the wake configuration message, and set its wake signal receiving component, such as tuner 304, to the RF channel frequency identified in the wake configuration message. The device may lock its tuner 304 on that frequency, keeping it there until the wake signal is received (or until the device is otherwise woken up, such as with a user pressing a button on a remote control).

In step 410, the device may configure its signal or modulation characteristic detector 307 to await receipt of the modulation characteristic change identified in the wake configuration message. For example, if the wake configuration message indicated that the wake signal would be two successive 0.8 dB increases in SNR over a one-second period, then the detector 307's logic may be configured to detect this modulation change. The detector 307 may be hard-wired to detect this kind of modulation change, such as by having analog signal strength circuits, such that no additional processor logic is required to remain active while the device is asleep. The detector 307 may be a passive circuit configured to detect the change in signal strength. Alternatively, the detector 307 may include a more sophisticated decoder processor, such as an MPEG decoder, configured to receive and decode a more sophisticated wake message, such as a wake code in an MPEG transport stream.

After the tuner 304 is locked on the wakeup frequency and the detector 307 is set to detect the wakeup change, then in step 411, the device may enter the sleep mode and power down various devices. This may include, for example, turning off the active power source 302. In the sleep mode, the sleeping device may then simply await receipt of the RF signal modulation change. While in this mode, the device can avoid having to decode incoming signals and to obtain a digital wake code, and can even power down a digital decoder that is normally used to receive and decode digital codes in incoming signals, thereby saving the energy that would otherwise be consumed in a system in which incoming signals were monitored for a digital wake up code. Instead, the device can await an incoming analog signal, in the form of a varied signal characteristic.

In step 412, the sleep management computing device may wait until it is time to wake a sleeping device, as indicated in the sleep schedule stored in step 407. The wake time can be determined based on the current time and the user's sleep/wake schedule stored in the configuration information in step 401. Alternatively, a wake event may be necessitated by some other event, such as a request from an external server to update information stored on the user's DVR 114, or if the user uses an external Internet site to add a program recording to the user's DVR, and that external site's server sends a request to wake up the user's DVR to download an updated record schedule. Another example may be related to billing. If a user's account becomes delinquent, but the user's DVR is sleeping, then the billing server may wish to wake up the DVR to send it a disconnection request. To do so, the billing server may first determine that the DVR is asleep (e.g., if an initial disconnect request is unanswered, or if it queries the sleep management computing device and learns that the DVR is asleep), and send a request to the sleep management computing device to wake up the DVR. Once the DVR is awake, the billing server can once again send a disconnect message to the DVR.

Another example may be to receive a software download or firmware upgrade. Since software downloads can be voluminous, the computer responsible for updating the sleeping device's software may not wish to wait until the device wakes up normally. The computer may send a wake request to the sleep management computing device, which in turn can send a wakeup signal to the device, and the update can then occur.

A myriad of other wakeup scenarios may exist (e.g., reminders, alarm clocks, incoming messages, Emergency Alert System (EAS) messages, remote monitoring, incoming voice or video call notifications, weather alerts, school closings, etc.), and any of those may result in an unscheduled wakeup.

If it is time to wake the device, then in step 413, the sleep management computing device may modify the RF signal modulation characteristic as indicated in the wake configuration message of step 408. This modulation may be received by not just the sleeping device's detector 307, but by various other devices connected to the same local office 103. However, the modulation change might simply be ignored by those other devices (e.g., they may simply ignore a temporary 0.8 dB increase in SNR), and instead the signal may be decoded by those other devices to retrieve encoded data.

Upon detecting the RF signal modulation change, the sleeping device may wake up in step 414. This waking up may entail, for example, the modulation characteristic detector 307 activating a control line to switch on the active power source 302. When the active power source 302 switches on, the rest of the sleeping device may be powered on, and may resume normal operation. Part of resuming normal operation may include transmitting a request to the sleep management computing device to request any updated sleep/wake configuration data, as well as monitoring received signals that are addressed to the device, and acting upon them.

In step 415, the sleep management computing device may transmit one of these messages. In particular, the sleep management computing device, after sending the wake signal by changing the RF signal modulation characteristic on the specified frequency, may then transmit a more detailed wake command message addressed to the once-sleeping device. The wake command message may include information that the sleeping device may have lost due to the sleep, such as the current time (date, etc.), relevant software patches and updates, an updated configuration file, or any other information that the device would have received had it been awake. The wake command may also include commands to instruct the device to take action, which may have been the reason for waking up. For example, if it is time to record a broadcast television program, then the wake command may instruct the device to make the recording, and may provide the device with the necessary event timer information such as service/channel, time, duration, etc. In some embodiments, the wake message may be sent as an MPEG (Moving Pictures Experts Group) message.

Figure 4B:
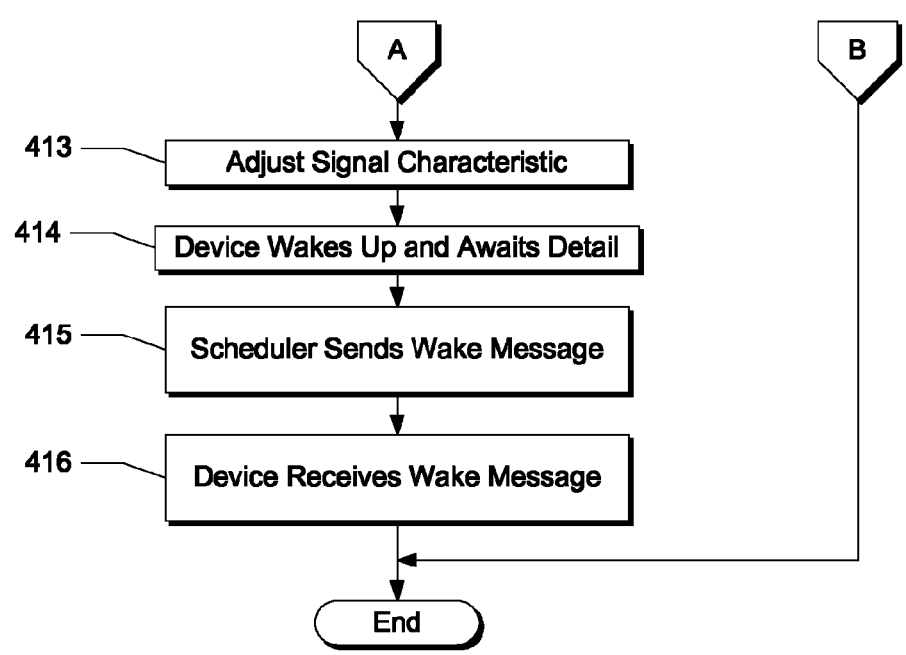

In step 416, the device may act on the wake message. This may include starting up an MPEG decoder to receive commands from the wake message, updating a local clock to indicate the new current time, installing any new software updates that it missed while it was asleep, and executing any commands that were in the wake message. Upon waking up, the device may also transmit requests to re-establish and re-authenticate any network connections that are needed for normal operation, and to request operational changes that may have occurred while it was asleep. For example, if a new entitlement password was issued to decode secured content (e.g., in response to a security breach involving an old password), the waking device may transmit a message to the entitlement server managing the secured content, and request an updated password. Once fully awake, the device may continue operation as normal, and the process in FIG. 4 can conclude (or return to step 401).

In some embodiments, the wake message may instruct the device to go back to sleep, but with an updated wake configuration message indicating a new RF frequency and/or modulation characteristic to use for the next wakeup. This may be useful, for example, if a local office 103's bandwidth usage changes after a device goes to sleep, and a previously identified RF channel becomes congested or otherwise unsuitable for use to carry the wakeup modulation characteristic change. The sleep management computing device can wake the sleeping device up, give it a new wake configuration message, and instruct it to return to sleep.

Since the bandwidth from the local office 103 to the homes 102 may be limited, and may be shared among multiple receiving devices, there may be times when a plurality of sleeping devices may all be configured to awake upon receipt of the same RF signal modulation characteristic change. If only a subset of them needed to actually wake up, the subsequent wake messages in step 415 would be addressed to the targeted devices, while the other ones would not receive a wake message directed to them. Those other devices may implement a timeout process, wherein if a detailed wake message is not received within a predetermined time period after the initial wakeup signal characteristic change was detected, then the device may return to sleep and resume awaiting receipt of the wakeup modulation characteristic change. To help confirm which devices were supposed to wake up, the wake message in step 415 can include a simple "you are awake" message addressed to the device(s) that were the reason for the wakeup message. Similarly, the wake message may also include a "go back to sleep" message addressed to the other devices that were asleep and awaiting the same signal characteristic change as a wakeup signal.

In the example above, the configuration data in step 401 is stored at the sleep management computing device. This configuration information may initially be generated by the device, with input from the user. For example, the user may access an Internet web page to provide his/her sleep/wake schedule and preferences. Alternatively, the configuration parameters may be generated locally at the user's devices, such as at the DVR 114, and the DVR may then transmit them up to the sleep management computing device.

In some embodiments, the sleeping device may be awoken independently of the sleep management computing device. For example, a user may return home from vacation early, and my wake the device by pressing a button on the device, or issuing a local remote control command. In such a situation, the sleeping device may wake, and as part of its wakeup process, the device may transmit a message to the sleep management computing device, informing it that the sleeping device is now awake, and requesting any updated information that has changed since the device went to sleep. The sleep management computing device may use this wake indication to update stored information identifying the sleep/wake status of the device, and can be used to cancel unneeded wake commands (e.g., if the device was scheduled to be woken up at 5 pm, but it has already woken up, then no further wakeup signal is needed).

In some embodiments, the modulation characteristic detector 307 may itself include a local sleep scheduler, which may be a timing circuit with a clock and memory storing information identifying one or more wakeup times. The local sleep scheduler may allow the user to locally define a sleep/wake schedule that can operate independently of the sleep management computing device. For example, the user may indicate that the device should sleep after 2 hours of inactivity, and this preference could take priority over the sleep/wake schedule maintained at the sleep management computing device. In such an embodiment, the waking device may send a message to inform the sleep management computing device that the waking device has woken up. In response, the sleep management computing device may update stored information identifying the waking device (e.g., via its MAC address or other unique device ID) and the time of its waking, and use this information to manage the sleep/wake cycle for the device. In some embodiments, a sleeping device may keep the local scheduler active in a light sleep mode (e.g., step 404), such that the sleeping device may be woken up by either a local scheduler command or a remote wake signal from the sleep management computing device. The sleeping device may alternative enter a deep sleep mode, in which the local scheduler is also deactivated, and the device is awoken only by the signal characteristic change, or by some user command entered at the device (e.g., the user pressing a button on the device, or cycling its power, etc.).

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

We claim:

1. A method comprising:
   determining that a device should enter a sleep mode;
   transmitting, in response to determining that the device should enter the sleep mode, a sleep mode configuration request to a remote computing device;
   receiving, from the remote computing device, a wake configuration file identifying a first frequency and a predetermined change in a signal characteristic, wherein the predetermined change comprises at least a change in a number of Quadrature Amplitude Modulation (QAM) points received on the first frequency;
   setting a component of the device to the first frequency;
   configuring the component to detect the predetermined change in the signal characteristic;
   detecting, by the component, the predetermined change in the signal characteristic; and
   waking the device from the sleep mode in response to detecting the predetermined change in the signal characteristic.

2. The method of claim 1, wherein detecting the predetermined change in the signal characteristic comprises detecting a predetermined change in a signal-to-noise ratio on the first frequency.

3. The method of claim 1, wherein detecting the predetermined change in the signal characteristic comprises detecting a predetermined change in a power level on the first frequency.

4. The method of claim 1, wherein detecting the predetermined change in the signal characteristic comprises detecting a blanking of a signal on the first frequency.

5. The method of claim 4, wherein detecting the blanking of the signal on the first frequency further comprises detecting a predetermined pattern of signal blanking on the first frequency.

6. The method of claim 1, further comprising:
receiving, by the remote computing device, a plurality of wake configuration requests from a plurality of devices; and
assigning groups of the plurality of devices to different predetermined changes in signal characteristics of the first frequency.

7. The method of claim 6, further comprising assigning different combinations of two or more predetermined changes in signal characteristics of the first frequency to different groups of the plurality of devices.

8. The method of claim 1, further comprising instructing different device components to monitor different frequencies for changes in signal characteristics on the different frequencies.

9. A computing device, comprising:
a radio frequency (RF) tuner;
a signal characteristic detection circuit coupled to an output of the tuner; and
a processor, configured to perform the following:
determine that a device may enter a sleep mode;
receive, from a remote computing device, a wake configuration message comprising a first radio frequency on which a wakeup signal is expected to be received and a predetermined wakeup signal characteristic change;
set the RF tuner to the first radio frequency;
detect, with the signal characteristic detection circuit, the predetermined wakeup signal characteristic change; and
initiate an exit from the sleep mode in response to the detection,
wherein the processor is further configured to place the device in a light sleep mode, and to permit waking the device from the light sleep mode in response to both the predetermined wakeup signal characteristic change on the first radio frequency and a locally-generated wakeup signal from a sleep scheduler circuit.

10. The device of claim 9, wherein the predetermined wakeup signal characteristic change is a change in a signal-to-noise ratio on the first radio frequency.

11. The device of claim 9, wherein the predetermined wakeup signal characteristic change is a change in a number of Quadrature Amplitude Modulation (QAM) points received on the first radio frequency.

12. The device of claim 9, wherein the predetermined wakeup signal characteristic change is a change in a power level on the first radio frequency.

13. The device of claim 12, wherein the predetermined wakeup signal characteristic change is a predetermined pattern of power level changes on the first radio frequency.

14. The device of claim 9, wherein the processor is further configured to power down other components of the device when entering the sleep mode.

15. A method, comprising:
storing, at a computing device, sleep mode configuration data for a plurality of remote devices;
receiving a request from a first remote device to enter a sleep mode;
identify, in response to receiving the request, in the stored sleep mode configuration data, a wakeup signal characteristic change corresponding to the first remote device, and a wakeup signal frequency, wherein the wakeup signal characteristic change comprises a change in a number of Quadrature Amplitude Modulation (QAM) points received on the wakeup signal frequency; and
in response to determining that the first remote device should wake, transmitting the wakeup signal characteristic change on the wakeup signal frequency.

16. The method of claim 15, wherein the wakeup signal characteristic change further comprises a change in a power level on the wakeup signal frequency.

17. The method of claim 16, wherein the wakeup signal characteristic change further comprises a predetermined pattern of power level changes on the wakeup signal frequency.

18. The method of claim 15, further comprising:
receiving, by the computing device, a plurality of wake configuration requests from one or more of the plurality of remote devices; and
assigning groups of the one or more of the plurality of remote devices to different predetermined changes in modulation characteristics of the wakeup signal frequency.

19. The method of claim 15, wherein the wakeup signal characteristic change further comprises a change in a signal-to-noise ratio on the wakeup signal frequency.

20. The method of claim 15, wherein the wakeup signal characteristic change further comprises a predetermined pattern of signal blanking on the wakeup signal frequency.

* * * * *